Patented Aug. 2, 1949

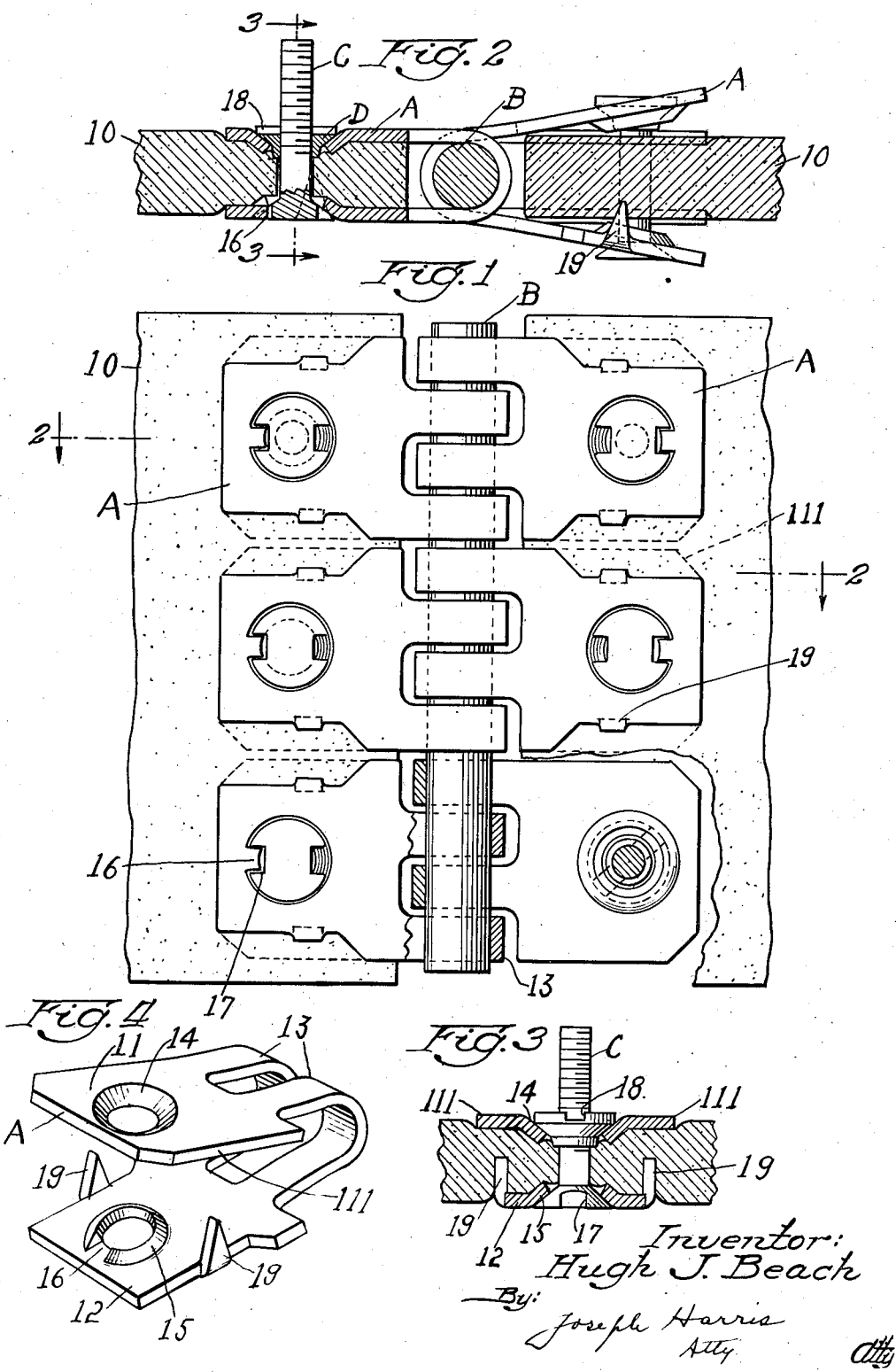

2,477,855

UNITED STATES PATENT OFFICE 2,477,855

FLEXIBLE BELT FASTENER

Hugh J. Beach, Glen Ellyn, Ill., assignor to Flexible Steel Lacing Company, Chicago, Ill., a corporation of Illinois Application October 29, 1945, Serial No. 625,395

2 Claims. (Cl. 24—33)

This invention relates to improvements in flexible belt fasteners and, more specifically, fasteners for heavy duty such as conveyors and the like.

One object of the invention is to provide an extremely strong and efficient plate fastener element for heavy belts and conveyors of the flexible type wherein the attachment to the belt or conveyor end is made unusually effective without injurious disruption of the belt or conveyor material.

Another object of the invention is to provide a fastener of the type indicated wherein embedded prongs are utilized for retaining the plate fastener attaching members in place, the attaching members and associated prongs being so arranged that portions of the attaching members automatically serve as backing elements while the prongs are being embedded in the material to thereby prevent improper displacement or rupture of the material and hence weakening of the attachment.

More specifically, an object of the invention is to provide a heavy duty flexible fastener employing U-shaped heavy plate attaching members having embedable prongs in combination with bolt and nut securing means, the combination of parts being so arranged that, as the securing mean are gradually tightened up, one arm of the U-shaped attaching member functions as an anvil or backing for the belt or conveyor material while the prongs are being embedded in the material, thereby preventing the material being ruptured or displaced and insuring an exceptionally strong attachment that will withstand exceedingly heavy pulling strains.

Other objects of the invention will more clearly appear from the description and claims hereinafter following taken in connection with the accompanying drawing.

In said drawing, Fig. 1 is a bottom plan view of adjacent ends of a belt secured by a plurality of the improved fasteners, portions being broken away to better illustrate certain details of construction. Fig. 2 is a vertical, longitudinal section corresponding to the line 2—2 of Fig. 1, one of the attaching members being shown in its condition approximately at the beginning of the entrance of the prongs into the belt material. Fig. 3 is a vertical section corresponding to the line 3—3 of Fig. 2. And Fig. 4 is a perspective of one of the attaching members in the condition as manufactured prior to application.

In said drawing 10—10 indicate the adjacent ends of a heavy duty belt or conveyor and which are shown flexibly connected by three of the improved fasteners. Each fastener, as shown, comprises two attaching members A—A; a hinge pin B which, as shown, is common to all the fasteners; a bolt C; and a nut D.

Each attaching member A is preferably in the form of a relatively heavy plate bent, initially to a somewhat flaring U shape or form, having an upper or outer arm 11, an inner or lower arm 12, and a pair of laterally separated, connecting loops 13—13.

The two arms are provided with alinable openings for the reception of the bolt shank, the opening in the upper arm 11 being formed with a continuous countersink 14 and the lower arm 12 with an interrupted countersink 15, the latter thereby leaving a radially inwardly extending lug 16, for the purposes hereinafter described.

The conical head of the bolt C, as shown, is formed with diametrically disposed notches 17—17, either of which is adapted to cooperate with the lug 16 to prevent turning of the bolt as will be apparent, when the conical head is seated in the countersink 15. The nut D, also of generally conical form to seat in the countersink 14, is formed with a screw slot 18 so that it may be readily screwed home by a suitable tool.

Referring to the flat, plate-like arm 11 and 12, it will be observed that only the arm 12 is provided with a pair of prongs 19—19 on the side edges of the main portion of the arm and that the arm 11 is made materially wider than the main portion of the arm 12 so that, as clearly shown at 111 in Fig. 3, the arm portions 111 overlie and extend laterally appreciably beyond the opposed prongs 19—19.

In applying the improved fasteners, the procedure is as follows. The belt or conveyor ends are first squared off and then punched at the proper points for the reception of the bolts. The attaching members A are then applied, one at a time, being suitably gauged while doing so, to insure the loops 13—13 being accurately projected beyond the belt end, as will be apparent. With the attaching member A in the flared form as manufactured and shown in Fig. 4, the bolt C is inserted through the openings of the member A and corresponding opening in the belt. The nut D is then screwed down and the arms 11 and 12 of the member A gradually forced toward each other as best indicated at the right hand side of Fig. 2, at which time the heavy prongs 19 begin to enter the belt material. In this connection, it is to be understood that, on account of the relatively heavy gage of the metal of which the members A are made, the heavy prongs 19 and countersinks 14 and 15, it is not feasible, practically, to employ a hammer or the like, as sometimes is customary with lighter types of fasteners, to deform the arms 11 and 12 to the final U-shape shown at the left hand side of Fig. 2. On the contrary, a steady, powerful squeezing force is essential which is supplied by the use of the bolt and nut arrangement shown and by reason of which it is possible to properly embed the prongs, countersinks and the main portions, partially, into the belt material as shown best in Fig. 3.

Because of the heavy type prongs 19 necessarily employed, it is essential that means be employed to prevent the prongs from so rupturing the belt material as to destroy the effectiveness of the prongs as securing elements. This function is performed by the overlying and extended portions 111—111 of the upper or outer arm 11, which serve more or less as anvils against which the belt material is compressed by the prongs without danger of the material being either ruptured or swelled or the attaching member displaced and resulting in an extremely strong attachment to the belt end. As will also be obvious, the opposed countersinks 14 and 15, when embedded in the material as shown in Figs. 2 and 3, also serve effectively as securing means and, additionally, to compress the belt material against the prongs 19 located transversely in line therewith.

When the necessary number of attaching members A has been secured to the respective belt ends, they are brought together with the loops 13—13 properly interdigitated and the pin or pins B inserted, as will be understood. In actual practice, the excess lengths of the bolts will be twisted or sheared off after the nuts have been finally screwed home.

From the preceding description, it will be seen that the improved fastener provides an unusually firm attachment to the belt ends that will not easily pull out and which will withstand great tension and hence is especially adapted for heavy duty as with large belt or conveyor loads. While the preferred form of the invention has been shown and described, the same is only illustrative and all changes and modifications are contemplated that come within the scope of the appended claims.

What is claimed is:

1. As an article of manufacture, an attaching member for a heavy duty belt fastener of the type employing two similar attaching members flexibly united by a hinge pin, said attaching member comprising: a relatively heavy-gauge plate of flaring U-form, the two main arms of the attaching member being integrally united by loops separated laterally a distance greater than the width of a loop for cooperation with another attaching member, one of said arms having a heavy prong on each side edge extended toward the other of said arms, said other arm of the attaching member being prongless and of sufficiently greater width than the pronged arm as to overlie and extend laterally beyond said side edge prongs to thereby provide a backing for compressing the belt material when said prongs are forced into the belt material and prevent swelling of the belt opposite the prongs, said arms being also provided with aligned openings surrounded by inwardly directed countersinks for the reception of a conical headed bolt and cooperable conical nut, respectively, whereby when the attaching member is applied to the belt end by such bolt and nut, tightening of the nut on the bolt will deform the attaching member to bring the arms into parallelism and progressively embed the prongs and countersinks in the belt material.

2. An attaching member for a belt fastener in accordance with claim 1, wherein said prongs are located transversely of the plate in alignment with the countersinks to compress the belt material between the countersinks and prongs when the attaching member is applied.

HUGH J. BEACH.

REFERENCES CITED

The following references are of record in the file of this patent:

UNITED STATES PATENTS

| Number | Name | Date |
|--------|------|------|
| 899,962 | Avery | Mar. 19, 1899 |
| 1,382,799 | Purple | June 28, 1921 |